United States Patent [19]
Sutherland

[11] 3,956,575
[45] May 11, 1976

[54] COUPLER FOR JOINING THREE CABLES

[75] Inventor: Byron C. Sutherland, Pearland, Tex.

[73] Assignee: Walker, Hall, Sears, Inc., Houston, Tex.

[22] Filed: Aug. 30, 1974

[21] Appl. No.: 502,254

[52] U.S. Cl. .............................. 174/87; 174/72 R; 174/93; 339/103 R; 340/7 R; 340/17 R
[51] Int. Cl.² .................... H01R 5/02; H01R 5/04; H01R 13/58; G01V 1/16
[58] Field of Search ............ 174/52 S, 65 R, 65 SS, 174/71 R, 72 R, 77 R, 87, 93, 135; 339/94 R, 94 M, 103 R, 103 B, 103 M, 106, 151 C, 213 R; 340/7 R, 17

[56] References Cited
UNITED STATES PATENTS

| | | | |
|---|---|---|---|
| 2,688,651 | 9/1954 | Blake | 174/93 |
| 3,449,507 | 6/1969 | Channell | 174/93 |
| 3,710,003 | 1/1973 | Channell | 174/77 R X |
| 3,744,008 | 7/1973 | Castellani | 339/103 B |

FOREIGN PATENTS OR APPLICATIONS

| | | | |
|---|---|---|---|
| 829,621 | 4/1938 | France | 174/93 |
| 152,963 | 2/1963 | U.S.S.R. | 340/17 |
| 616,646 | 9/1947 | United Kingdom | 339/213 R |

*Primary Examiner*—Laramie E. Askin
*Attorney, Agent, or Firm*—Michael P. Breston

[57] ABSTRACT

A waterproof coupler having a casing and a cap to form a junction box for enclosing a junction between a plurality of electric conductors. The casing has a single opening to enclosingly receive the junction. A plug member constructed of resilient material defines passages therethrough for the conductors. The member is adapted, when compressively urged by the cap into sealing position with the opening, to simultaneously seal the casing and the junction between the conductors. The bare ends of the conductors are anchored by solder balls to a disc positioned inside the casing.

1 Claim, 7 Drawing Figures

COUPLER FOR JOINING THREE CABLES

BACKGROUND OF THE INVENTION

In marsh and swamp seismic prospecting, geophone cable spreads are used, each including a through cable having electrical junctions at spaced intervals from which leader cables are dropped. The through cable is layed along the ground. At the end of each leader cable is a geophone case which is implanted with a special tool into the mud for detecting returned seismic waves. In each junction box the conductors of the through cable and of the leader cable are suitably electrically joined together.

There are two commercially known T's which are presently being widely used. One is a completely molded T around the cables' junction providing no access to the electric wires; the other is a fastened T formed from two half-T's which are clamped together around the junction, and then the inside of the T is filled with a suitable potting compound. Both known T's provide a waterproof junction, but the molded T is impossible to repair in the field because the seismic crew has no injection molding equipment, while the fastened T requires considerable skill and time first to dismantle and remove the potting compound and then to re-assemble and to reshoot the compound into the T. To carry out the repair job, there is a need for special purpose tools and sealing compounds which are not generally available in remote areas, as in jungles or swamps.

For the following reasons it may be necessary to inspect or repair a wire junction within a T: cables and T's are frequently damaged by physical objects and their outer jackets and housings are eaten up by rodents; leader cables are dropped typically from the side of a pontoon and then to retrieve them a crewman is supposed to pull on the leader cable but instead he will frequently grab each T and pull on the T to retrieve the leader cable and the geophone case at the end thereof. Since the known T's do not include anchoring means, a strong pull on the T itself will break the electric connections inside the T, or break its waterproof seal, or even completely sever the T from its leader cable. Thus, a very costly entire geophone cable spread may have to be discarded for failure of a single T, or if a field repair job is attempted, very expensive field crew time is lost in repairing the fastened T in accordance with prior practice. The molded T is not field repairable, as previously mentioned.

It is a main object of the present invention to overcome the above mentioned drawbacks of the known T's and to provide a coupler serving as a waterproof junction box which allows access to the junction without requiring molding facilities, special purpose tools for assembly and disassembly, sealing compounds and potting guns. It is another object to provide an internal anchor for securing the electric conductors inside the junction box so that a pull on the box itself will not ordinarily rupture the junction therein or damage the waterproof seal.

SUMMARY OF THE INVENTION

A waterproof coupler is provided to serve as a junction box adapted to enclose a junction between a plurality of electric conductors. The coupler has a casing with a single opening for enclosingly receiving the junction. A plug constructed of resilient material has passages therethrough for the conductors. A compression applying cap compressively urges the plug into sealing position with the opening to simultaneously seal the casing and the conductors. The cap is threadedly connected to the casing to hold the plug in its sealing position. A disc anchor is provided inside the casing for anchoring the conductors thereto.

DETAILED DESCRIPTION OF A PREFERRED EMBODIMENT

Figure 1:
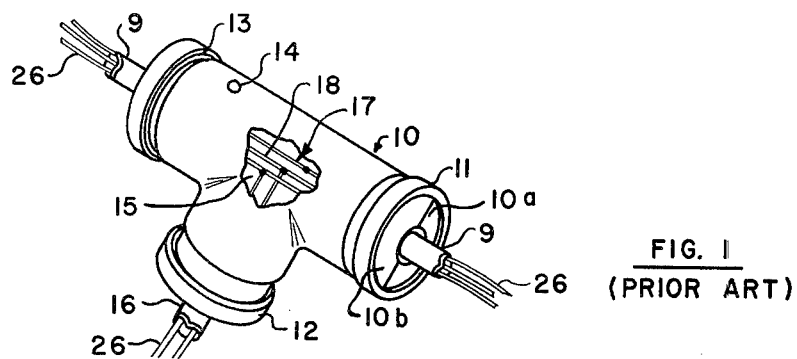
FIG. 1 shows in perspective one type of prior art T.
Figure 2:
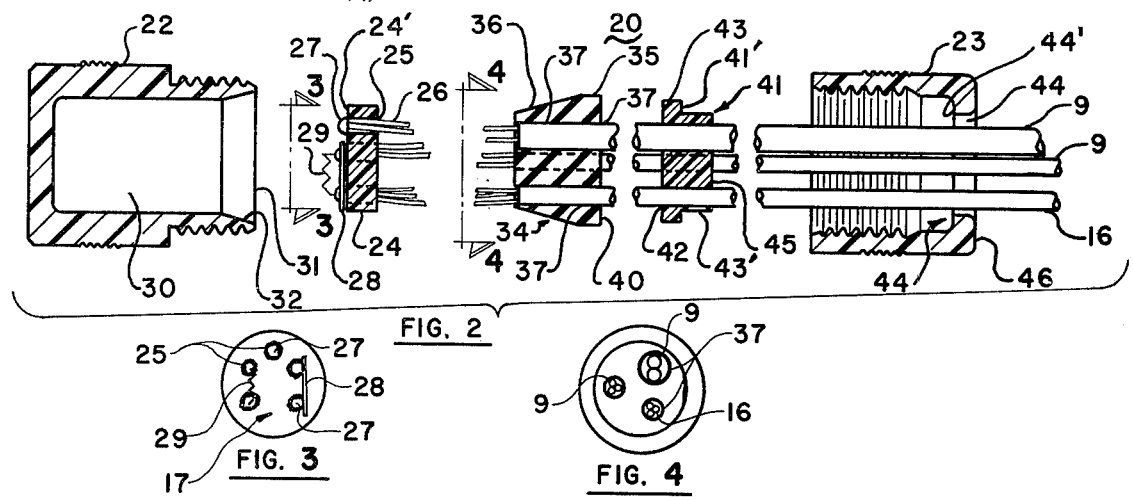
FIG. 2 is an exploded view in section of the coupler of this invention.
Figures 3, 4:
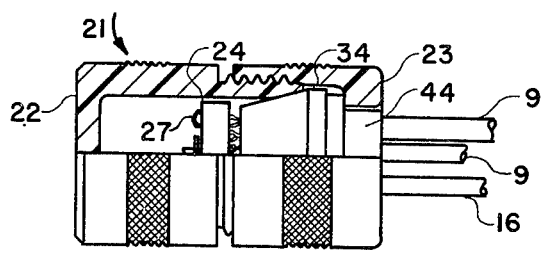
FIGS. 3 and 4 are respectively views on lines 3—3 and 4—4 in FIG. 2.
Figures 5, 6:
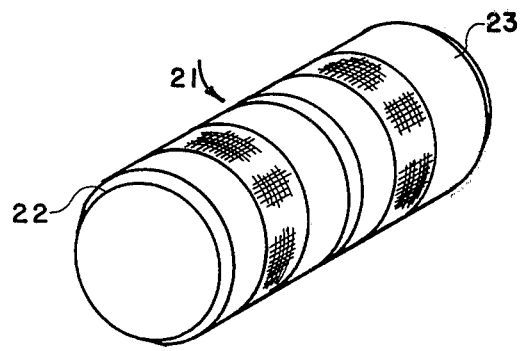
FIG. 5 is a partly broken away view of an assembled coupler of this invention.
FIG. 6 is a view in perspective of the assembled coupler.

FIG. 1 shows a fastened prior art T, generally designated as 10, made up from two half-T's 10a and 10b which are symmetrical relative to a vertical plane and are secured to each other by end rings 11, 12 and 13. A port 14 is adapted to receive the nozzle of a potting gun which can shoot into the T a waterproofing potting that fills the T's entire inner chamber 15. The electric conductors 26 of the "through" cable sections 9, and of the leader cable 16 are electrically interconnected at a center junction 17 inside chamber 15. When the need arises to inspect or repair junction 17, rings 11, 12 and 13 are removed, the two halves 10a and 10b of the T are forced apart, the potting compound cut away, and the electric connections of junction 17 inspected or repaired. For re-assembly, the two half-T's are positioned together, rings 11, 12 and 13 returned to their respective grooves, and chamber 15 is repotted through port 14 or through another opening made for that purpose. It will be apparent that such field repair or inspection of the wire junction 17 is very time consuming and requires sealing compounds and a potting gun, all of which are not easy to carry on a seismic crew operating in marshes and swamps.

For a better understanding of the preferred embodiment of the coupler of this invention, the same numerals will be used throughout the drawings for the same or similar parts.

Referring now to FIGS. 2–7, there is shown a junction box 20 utilizing the coupler 21 of this invention for sealingly receiving a wire junction 17 (FIG. 3) of cable sections 9 and 16. A plurality of cable sections can be joined, although in the drawings only three cable sections are joined. In the preferred embodiment, coupler 21 consists of an externally-threaded casing 22 adapted to couple with an internally-threaded cap 23. An anchor disc 24 has a number of small holes 25, each hole being adapted to snugly receive two or more electric conductors 26 of the cable sections 9 and 16 being joined. Typically each conductor is made up from a plurality of wire strands. The bare end of each conductor has its strands spread apart and filled with a solder ball 27 thereby anchoring the conductor's end to the inner face 24' of disc 24. Electric connections between balls 27 of conductors 26 are made as required by using small wire posts 28 and/or suitable electric components, for example, a resistor 29. The diameter of the anchor disc 24 is smaller than the diameter of inner chamber 30 in casing 22 to allow the disc to move easily therein. Chamber 30 is completely enclosed and communicates with the outside through one opening 31, preferably having a frusto-conical wall 32, as shown.

An elastic, compliant plugging member or plug, generally designated as 34, which may have a cylindrical wall portion 35 and a frusto-conical wall portion 36, is adapted for sealingly engaging its matching frusto-conical wall 32, thereby completely waterproofing chamber 30. To join three cable sections, plug 34 has three longitudinally-extending parallel bores 37, each accepting one of the cable sections 9 and 16. The inner diameter of each bore 37 is made only slightly larger than the outer diameter of its mating cable section to provide for a tight fit therebetween.

A compression applying means is adapted for applying pressure against the external wall 40 of plug 34. In the preferred embodiment, such means comprises a pressure disc 41 and the cap 23. Disc 41 has a cylindrical section 43, whose diameter is nearly the same as that of wall 40 of plug 34, and a reduced-diameter section 43' which fits inside a front window 44 in cap 23 which defines a shoulder 44' for applying pressure against a mating shoulder 41' of disc 41.

Figure 7:
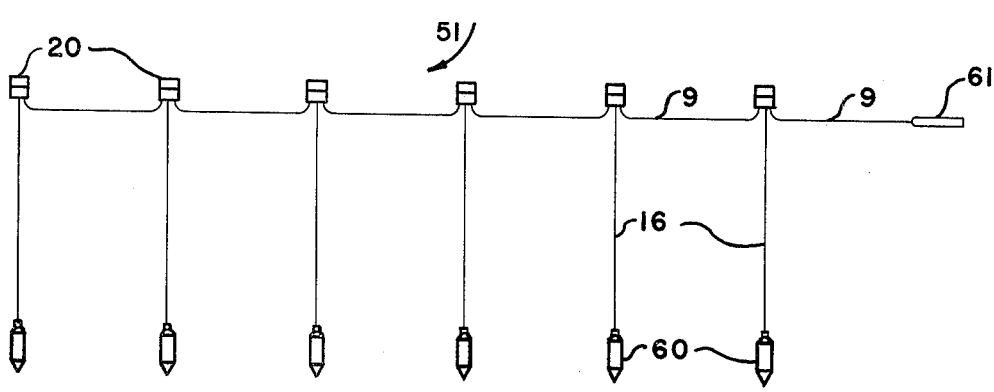
FIG. 7 illustrates a geophone cable spread utilizing the couplers of this invention.

In FIG. 7 is shown a typical application for the junction boxes 20. Through-cable sections 9 of a geophone spread 51 are laid on the ground and from them are dropped a plurality of leader cables 16. At the end of each cable 16 is a geophone case 60 housing a geophone (not shown) which is electrically connected to cable 16. It will be noted that the last junction box 20 couples only two cables, while the leading end of cable spread 51 is connected to a suitable plug 61 for connecting the spread to another spread or to a utilization device, such as a recorder, not shown.

Geophone cases 60 are implanted usually in marshy terrains for detection of reflected seismic waves. To retrieve each geophone case 60 after the seismic shooting is over, all that is necessary is to pull hard on leader cables 16, each of which is sufficiently strong to withstand a pulling force of about 400 pounds. On the other hand, if by accident or intent a junction box 20 of this invention is grabbed, it can also withstand a normal pull because it has inner anchoring means consisting of disc 24 and solder balls 27.

The manner of assembly and disassembly of each junction box 20 should be obvious from the drawings. All the cable sections whose conductors it is desired to join are made to pass through the window 44 in cap 23, then through the bores 42 of the pressure disc 41, and the bores 37 of plug 34. The appropriate bare ends of certain ones of the conductors of these cable sections, which it is desired to join together, are made to pass through certain ones of the holes 25 in anchor disc 24. Then the strands of the bare ends of these conductors are spread apart and filled with solder balls 27. It may be desired to have some balls 27 interconnected with the short wires 28 or with electric components 29.

When the electric interconductor junction 17 is made, then coupler 21 of this invention is assembled by threadedly coupling cap 23 to casing 22, whereby the pressure disc 41 will then exert a pressure on the outer face 40 of plug 34 thereby causing the plug to sealingly engage wall 32 and simultaneously sealingly engage the outer jackets of the cable sections inside bores 37, since a compressive force on the plug tends to reduce the diameters of bores 37. Thus, a compressive force simultaneously seals the opening 31 of coupler 21 and seals off about the conductors. For long life, the body material of plug 34 should be elastic so that the plant plug will not take on a permanent setting detrimental to its sealing function.

The major parts of the junction box 20 of this invention can be taken apart by unscrewing the cap 23 from casing 22, an action which can be easily done by hand, thereby immediately exposing junction 17 for inspection, testing, repair and alterations. The assembly and disassembly of each junction box 20 requires no special tools and no potting compound need be injected into chamber 30 from which, in accordance with this invention, water is excluded with the aid of only a single plug 34.

The above and other advantages as well as modifications of the preferred embodiment illustrated in the drawings will readily become apparent to those skilled in the art, and it is desired that all such advantages and modifications fall within the scope of the claims attached hereto.

What is claimed is:

1. A coupler for mechanically and electrically interconnecting the conductors of three cables comprising in combination:

a hollow, cylindrical casing having a wall at one end, an opening at the opposite end, and a chamber between said opening and said wall, said casing having a threaded portion on the cylindrical wall thereof near its open end;

three electric cables, each cable having at least two insulated metallic conductors, each conductor having a bare end;

a resilient plug having three parallel, longitudinal bores extending therethrough, each bore snuggly enclosing one of said cables therewithin, said plug having an external portion whose cross-sectional area is larger than the area of said opening, and an inner portion whose cross-sectional area is smaller than said opening, and said inner portion extending into said chamber;

said bore ends of said conductors projecting outwardly of said inner portion of said plug and into said chamber;

an anchor disc of insulating material positioned inside said chamber between said end wall and said inner portion of said plug, said disc having a plurality of holes, each hole accepting therethrough a group of the bare ends of said conductors which project into the portion of the chamber between the inner face of the disc and said end wall;

three solder balls on said inner face, each ball embedding one group of bare ends thereby anchoring the conductors to the disc and mechanically and electrically interconnecting the conductors of the cables to form a coupling therebetween;

a hollow, cylindrical cap having a threaded end portion on the cylindrical wall thereof in threaded engagement with said threaded portion on the cylindrical wall of said casing and being open at its opposite longitudinal ends; and said cap having means for applying pressure against said plug to seal off said opening in said casing and said bores in said plug.

* * * * *